Dec. 29, 1931.  W. I. STIMPSON  1,838,588
TEMPLE THREAD CUTTER FOR LOOMS
Filed April 20, 1931
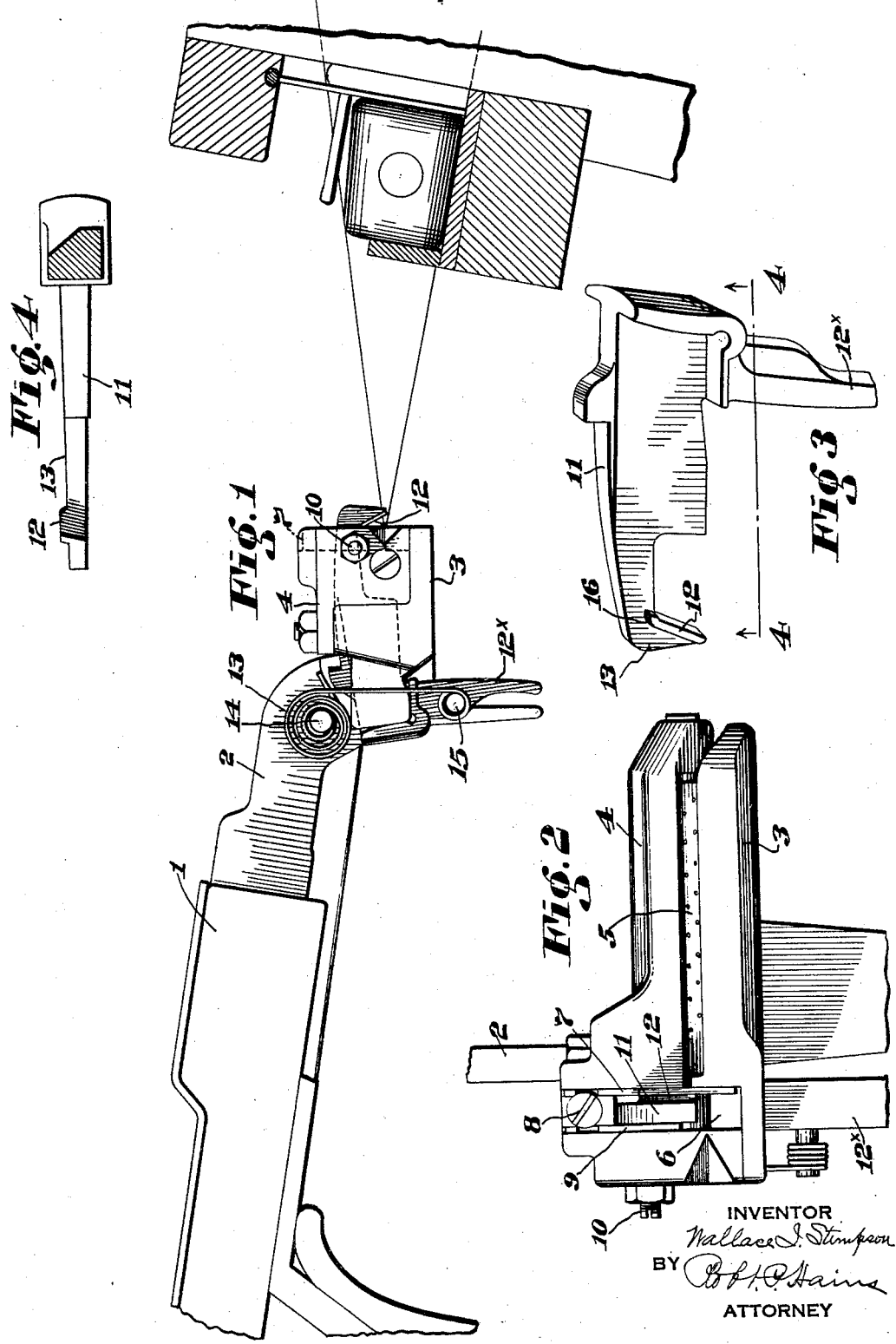
INVENTOR
Wallace I. Stimpson
BY
ATTORNEY Patented Dec. 29, 1931

1,838,588

UNITED STATES PATENT OFFICE

WALLACE I. STIMPSON, OF HOPEDALE, MASSACHUSETTS, ASSIGNOR TO DRAPER CORPORATION, OF HOPEDALE, MASSACHUSETTS, A CORPORATION OF MAINE

TEMPLE THREAD CUTTER FOR LOOMS

Application filed April 20, 1931. Serial No. 531,303.

This invention relates to thread cutting temples for looms and has for one of its objects to provide a simple and effective form of thread cutting temple in which the parts shall coact with a shearing cut to part the thread, guide the movable cutter carrier and automatically effect a sharpening action on the movable cutter blade.

Thread cutting temples are now ordinarily provided with a temple head and a fixed and movable cutter, which during loom operation serve to part the thread near the cloth selvage.

The present invention provides a stationary cutter mounted in vertical position on the temple head and a movable cutter carrying member having at its rear portion a cutting blade which extends laterally beyond the face of the cutter carrying member to coact with the stationary cutter and part the thread during the loom operation. By reason of the fact that the cutting blade on the carrying member extends beyond the side face of said member, the edge portion of the movable blade rests upon the vertical face of the stationary cutter and serves to guide the rear end of the carrying member and to automatically maintain a sharpened edge on the movable cutting blade.

The invention and novel features thereof will best be made clear from the following description and accompanying drawings of one good form thereof.

In the drawings:—

Fig. 1 is a side elevation of a temple thread cutter involving the present invention, portions of the lay being shown in section;

Fig. 2 is a rear elevation of the temple thread cutter detached;

Fig. 3 is an enlarged side elevation of the movable cutter carrying member separated from its coacting parts; and Fig. 4 is a section on the line 4—4 of Fig. 3.

The temple as a whole is mounted upon a suitable support at the front of the loom and is located at the side of the fabric being woven and as shown the temple comprises the usual temple case 1 and the temple bar 2 mounted for movement in the case towards and from the front of the loom, as usual.

The temple bar 2 carries the temple head which comprises the pod 3 and cap 4 between which is mounted the usual temple roll 5 of any preferred construction.

The temple head is provided with the usual recess or guide 6 and at one side of the recess or guide 6 is the stationary cutter blade 7 which may be secured in vertical position to cooperate with the movable cutter blade by means of a screw 8. At the opposite side of the recess or guide 6 is a plate 9 which may likewise be held in position on the temple head by the screw 8 and in order that the plate 9 may be adjustable to vary its position an adjusting screw 10 is threaded through the temple head to bear upon the outer face of the plate 9. The parts thus far described may be substantially as shown in the patent to Edward S. Stimpson No. 1,366,034, dated January 18, 1921.

Mounted for movement backward and forward in the recess or guide 6 is the movable cutter carrying member 11 which has a downwardly extending heel 12* to which is connected a spring 13, one portion of which is mounted upon a pin 14 on the temple bar and the other of which is connected to a pin 15 on the heel 12*, the construction being such that the spring 13 normally acts upon the heel 12* of the movable cutter carrying member 11 to maintain it in rearward position with permissive movement forwardly, all as now common and well known in the art.

The movable cutter carrying member 11 varies in thickness from its front to its rear end portion, as more clearly indicated in Fig. 4 and the rear end portion of the cutter carrying member is provided with a cutter 12, which extends laterally beyond the side face 13 of the carrying member. As will be apparent from Fig. 4 also, the lateral extension of the cutter 12 beyond the face 13 of the carrying member is such that the transverse length of the cutter or blade 12 is substantially equal to the thicker portion of the carrying member, the result being that when the carrying member partakes of its frontward and backward movements the projecting cutting edge portion of the cutting blade 12 will bear upon the vertical face of the stationary cutter and guide the thinner rear portion of the carrying member in its back and forth movement. The cutting blade as indicated more clearly in Fig. 3 extends in an inclined direction upwardly towards the front, and the top of the cutting blade 12 is preferably turned slightly as indicated at 16, so that when the movable cutter carrying member is in its rearward position, as indicated in Fig. 1, the top portion 16 at least of the cutting blade will rest against the vertical surface of the stationary cutter, the result being that when the movable cutter carrying member 11 is moved frontward and backward the cutting edge portion of the cutting blade 12 will cooperate with the cutting edge of the stationary vertical cutter 7 and will also act by reason of this engagement to guide the thinner rear end portion of the carrying member and prevent lateral movement thereof.

As shown more clearly in Fig. 4 the cutting blade 12 extends transversely of the carrying member beyond its face and in order that the cutting blade may become sharpened or maintained in sharpened condition during the movement of the carrying member the transversely extended portion of the cutting blade is formed or ground on an incline to the vertical face 13 of the carrying member. This results in maintaining the cutting edge of the movable cutting blade in sharpened condition by reason of this movement against the vertical face of the stationary cutter.

The condition just described is well shown in Fig. 2 wherein it will be noted that the thinner rear end portion of the movable cutter carrying member does not engage the vertical face of the stationary cutter, but on the contrary the laterally projecting edge portion of the movable cutting blade rests against the vertical face of the stationary cutter and thereby guides the rear end of the carrying member as it moves backward and forward during the loom operation and simultaneously therewith the rubbing action between the movable cutting blade 12 and the face of the stationary blade 7 serves to maintain automatically the cutting edge of the cutting blade in sharpened condition. This obviates the necessity of removing the movable cutting carrying member from time to time to grind or sharpen its cutting edge.

There will be some wear, of course, between the cutting edge of the movable cutting blade and the stationary cutter during the automatic sharpening operation of the cutting blade, but this is at once remedied and all lost motion taken up by means of the adjusting screw 10.

As the cutting edge portion of the movable cutting blade wears, the cutting edge will be maintained unimpaired by reason of the bevel or inclined formation of the cutting blade, as will be apparent from Fig. 4.

During the loom operation the heel 12* of the movable cutter carrying member 11 will be engaged by the lay or a part mounted thereon thereby causing the carrying member 11 to be moved frontwardly in opposition to the spring 13 and during its frontward movement the side cutting edge of the cutting blade 12 will move along the vertical face of the stationary blade in contact therewith, thereby guiding the thinner rear portion of the carrying member in its operative movements and maintaining the cutting edge of the cutting blade sharp.

It will thus be seen that a thread cutting temple is furnished by the present invention which is simple and economical in construction and gives an effective and accurate shearing action on the thread and wherein the movable cutting blade is automatically kept sharp by the rubbing contact of its laterally projecting edge with the fixed cutter.

What is claimed is:—

1. A thread cutting temple for looms, comprising a stationary vertical cutter, a movable cutter carrying member mounted in the temple head for backward and forward movement therein, and a cutting blade extending laterally beyond the side face of the movable cutter carrying member to present its laterally extended cutting edge in cooperative relation with the stationary cutter.

2. A thread cutting temple for looms, comprising a stationary cutter fixed in the temple head, a movable cutter carrying member mounted in the temple head for backward and forward movement therein, and a cutting blade at the rear end portion of the carrying member projecting laterally beyond a vertical plane passing through the side face of the carrying member and formed with a bevel transversely inclined to said plane.

3. A thread cutting temple for looms, comprising a stationary cutter fixed in the temple head, a movable cutter carrying member mounted in the temple head for backward and forward movement therein, and a cutting blade at the rear end portion of the carrying member projecting laterally beyond a vertical plane passing through the side face of the carrying member and formed with a bevel transversely inclined to said plane and means for pressing the laterally extended edge of the blade into cooperating relation with the cutting edge of the stationary cutter.

4. A thread cutting temple for looms, comprising a stationary vertical cutter secured in the temple head, a movable cutter carrying member mounted for backward and forward movement in the temple head and diminished in thickness at its rear end portion, and a cutting blade on the carrying member at the rear end portion extending laterally beyond the side face of the cutter carrying member to present its laterally projecting cutting edge in cooperating relation with the stationary cutter and guide the rear end portion in the backward and forward movement of the carrying member.

5. A thread cutting temple for looms, comprising a stationary vertical cutter secured in the temple head, a movable cutter carrying member mounted for backward and forward movement in the temple head and having a relatively thin rear portion, a cutting blade at the relatively thin rear portion extending laterally beyond the side face thereof to bear upon the side of the stationary cutter and guide the thin rear portion from lateral movement during the backward and forward movement of the cutter carrying member.

6. A thread cutting temple for looms, comprising a stationary vertical cutter secured to the temple head, a movable cutter carrying member mounted for backward and forward movement in the temple head, a cutting blade on the rear end portion of the carrying member extending in a direction laterally inclined to and beyond the side face of the carrying member to bear upon the vertical face of the stationary cutter so that the acting edge of the blade will be sharpened automatically during the backward and forward movement of the cutter carrying member.

In testimony whereof, I have signed my name to this specification.

WALLACE I. STIMPSON.